(12) United States Patent
Yamagata et al.

(10) Patent No.: US 7,839,457 B2
(45) Date of Patent: Nov. 23, 2010

(54) DISPLAY IMAGE CORRECTING DEVICE, IMAGE DISPLAY DEVICE, AND DISPLAY IMAGE CORRECTING METHOD

(75) Inventors: Hiroshi Yamagata, Kanagawa (JP); Yoshiki Shirochi, Chiba (JP); Toshinari Fuchigami, Kanagawa (JP); Akira Shirahama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1111 days.

(21) Appl. No.: 11/530,376

(22) Filed: Sep. 8, 2006

(65) Prior Publication Data

US 2007/0070085 A1 Mar. 29, 2007

(30) Foreign Application Priority Data

Sep. 29, 2005 (JP) .............................. 2005-283985
Jul. 19, 2006 (JP) .............................. 2006-196669

(51) Int. Cl.
*H04N 5/57* (2006.01)
*H04N 9/69* (2006.01)
*H04N 9/31* (2006.01)

(52) U.S. Cl. ....................... 348/687; 348/675; 348/745; 348/806

(58) Field of Classification Search ................. 348/687, 348/571, 649, 671, 673–675, 708, 725, 728, 348/744, 745, 806, 807; 345/204, 690, 102; *H04N 5/57, H04N 9/64, 5/14, 5/202, 9/69, 5/44, 5/455, H04N 9/31, 3/22, 9/28*
See application file for complete search history.

(56) References Cited

U.S. PATENT DOCUMENTS 5,260,797 A * 11/1993 Muraji et al. ............... 348/745
5,838,396 A * 11/1998 Shiota et al. ................ 348/745
2002/0036723 A1* 3/2002 Ishii et al. ................... 348/807

FOREIGN PATENT DOCUMENTS

| JP | 6-138849 | 5/1994 |
|---|---|---|
| JP | 8-171371 | 7/1996 |
| JP | 11-109927 | 4/1999 |
| JP | 11-113019 | 4/1999 |
| JP | 11-183894 | 7/1999 |
| JP | 2000-284773 | 10/2000 |
| JP | 2000-316170 | 11/2000 |
| JP | 2001-231053 | 8/2001 |
| JP | 2003-44005 | 2/2003 |
| JP | 2003-46809 | 2/2003 |
| JP | 2005-17715 | 1/2005 |

\* cited by examiner

*Primary Examiner*—Sherrie Hsia
(74) *Attorney, Agent, or Firm*—Oblon, Spivak, McClelland, Maier & Neustadt, L.L.P.

(57) ABSTRACT

A display image correcting device including, retaining section configured to retain reference correction amount data for correcting nonuniformity as a predetermined factor of an image displayed on a basis of a video signal, the reference correction amount data representing an amount of correction at a predetermined horizontal and vertical position of the image, the amount of correction being obtained in correspondence with a video signal level as a reference, and correcting section configured to perform correction processing on the video signal in correspondence with a horizontal direction and a vertical direction of the image, and a brightness direction, and performing the correction processing on a basis of three-dimensional correction amount data obtained by making two-dimensional correction amount data corresponding to a horizontal and vertical position, the two-dimensional correction amount data being obtained on a basis of the reference correction amount data, linearly proportional or non-linearly proportional to level of the video signal to be corrected.

16 Claims, 11 Drawing Sheets

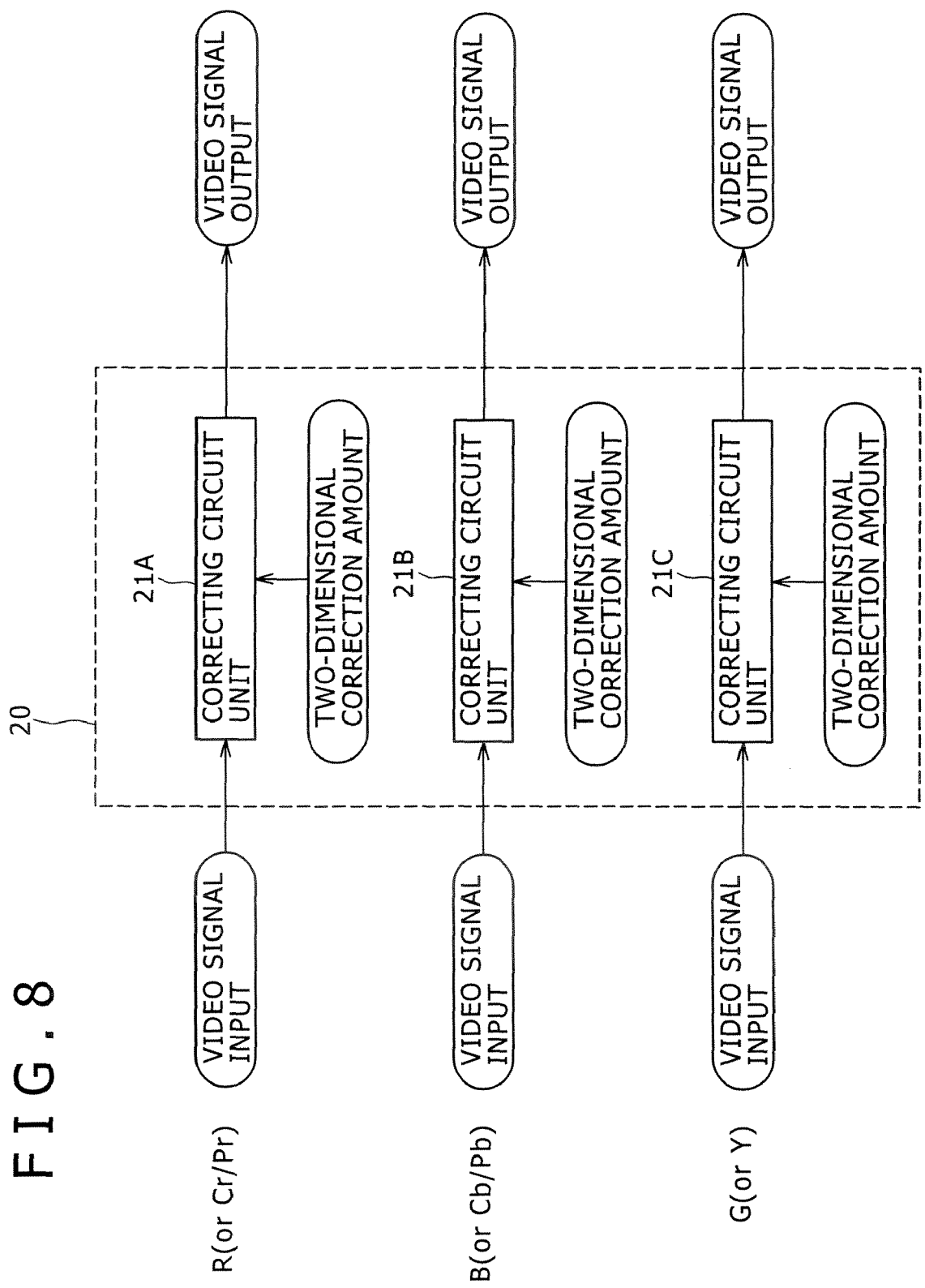

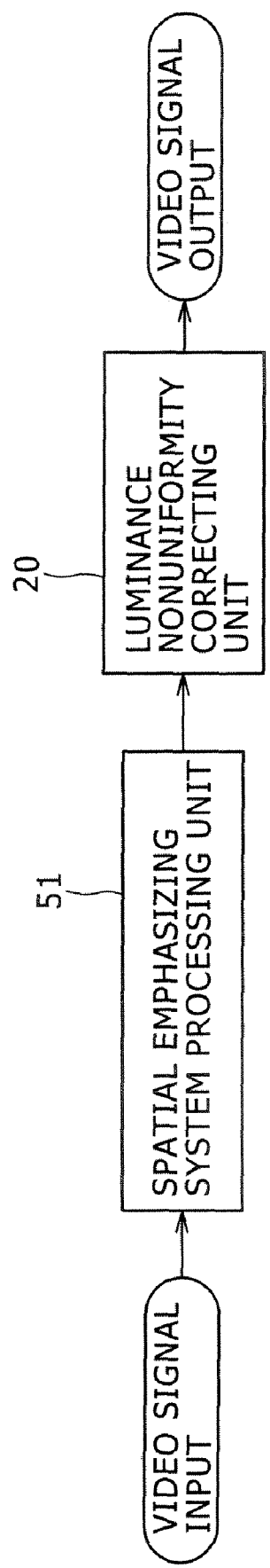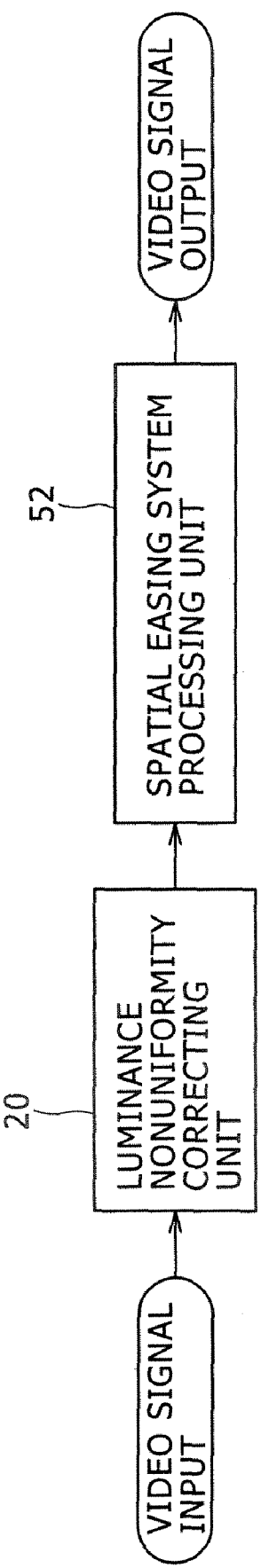

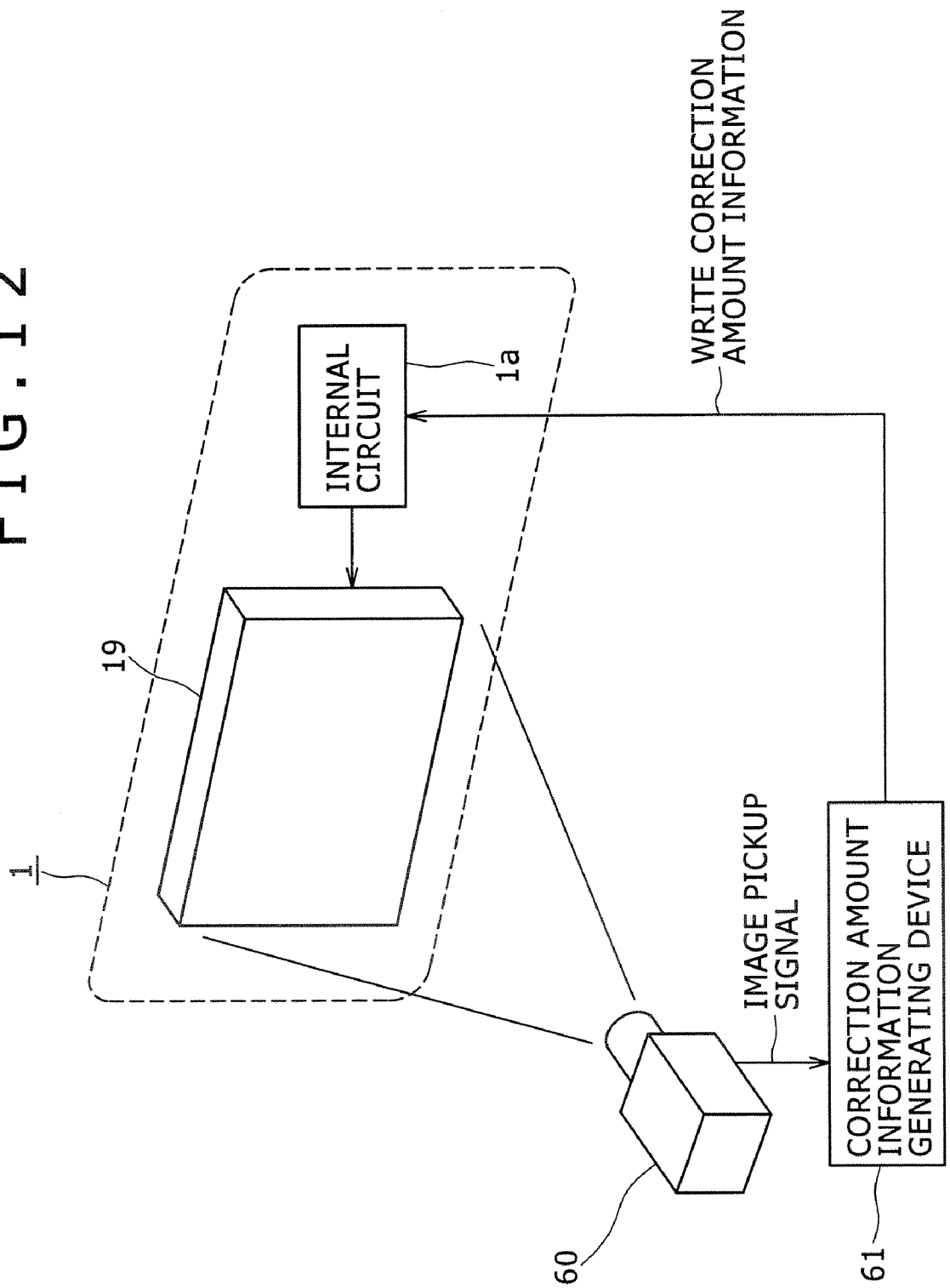

DISPLAY IMAGE CORRECTING DEVICE, IMAGE DISPLAY DEVICE, AND DISPLAY IMAGE CORRECTING METHOD

CROSS REFERENCES TO RELATED APPLICATIONS

The present invention contains subject matter related to Japanese Patent Application JP 2005-283985 filed in the Japanese Patent Office on Sep. 29, 2005, and Japanese Patent Application JP 2006-196669 filed in the Japanese Patent Office on Jul. 19, 2006, the entire contents of which being incorporated herein by reference.

BACKGROUND OF THE INVENTION

1. Field of the Invention

The present invention relates to a display image correcting device for performing correction processing on a video signal to correct a predetermined degrading factor of a displayed image, and a method thereof. The present invention also relates to an image display device to which the constitution of such a display image correcting device or the method thereof is applied.

2. Description of the Related Art

With an image display device such as displays an image on the basis of a video signal, a phenomenon of so-called luminance nonuniformity, in which phenomenon uniformity of a luminance distribution in the area of an image displayed on a screen is impaired due to a structural problem or manufacturing variations, for example, may occur. Such luminance nonuniformity is one factor in degrading image quality, and is required to be eliminated or suppressed especially in a case of color image display because chromaticity nonuniformity is also caused. Accordingly, as shown in Japanese Patent Laid-Open No. 2001-231053 (hereinafter referred to as Patent Document 1), for example, a constitution for correcting luminance nonuniformity is proposed.

SUMMARY OF THE INVENTION

The present invention also proposes a constitution for correcting luminance nonuniformity of a displayed image, and it is desirable to make the luminance nonuniformity correction more efficiently than before.

Accordingly, in view of the above-described problems, a display image correcting device according to an embodiment of the present invention is formed as follows.

The display image correcting device includes: retaining means configured to retain reference correction amount data for correcting nonuniformity as a predetermined factor of an image displayed on a basis of a video signal, the reference correction amount data representing an amount of correction at a predetermined horizontal and vertical position of the image, the amount of correction being obtained in correspondence with a video signal level as a reference; and correcting means for performing correction processing on the video signal in correspondence with a horizontal direction and a vertical direction of the image, and a brightness direction, and performing the correction processing on a basis of three-dimensional correction amount data obtained by making two-dimensional correction amount data corresponding to a horizontal and vertical position, the two-dimensional correction amount data being obtained on a basis of the reference correction amount data, linearly proportional or nonlinearly proportional to level of the video signal to be corrected.

In addition, an image display device is formed as follows.

The image display device according to an embodiment of the present invention includes: a display image correcting device unit; and a display device unit for displaying an image on a basis of a video signal corrected by the display image correcting device unit.

The display image correcting device unit includes: retaining means configured to retain reference correction amount data for correcting nonuniformity as a predetermined factor of the image displayed on the basis of the video signal, the reference correction amount data representing an amount of correction at a predetermined horizontal and vertical position of the image, the amount of correction being obtained in correspondence with a video signal level as a reference; and correcting means for performing correction processing on the video signal in correspondence with a horizontal direction and a vertical direction of the image, and a brightness direction, and performing the correction processing on a basis of three-dimensional correction amount data obtained by making two-dimensional correction amount data corresponding to a horizontal and vertical position, the two-dimensional correction amount data being obtained on a basis of the reference correction amount data, linearly proportional or nonlinearly proportional to level of the video signal to be corrected.

In each of the above-described constitutions, in correcting two-dimensional luminance nonuniformity of an image displayed on a display screen part, which nonuniformity is referred to as luminance nonuniformity, for example, reference correction amount data as data representing an amount of correction at a predetermined horizontal and vertical position of the image, the amount of correction being obtained in correspondence with a video signal level (brightness) as a reference, is retained first. Then, at the time of the correction, a two-dimensional correction amount corresponding to a horizontal and vertical position is obtained on a basis of the reference correction amount data, and correction processing on a video signal is performed on a basis of a three-dimensional correction amount obtained by making the two-dimensional correction amount proportional to luminance of the video signal to be corrected.

The constitution for such correction enables correction processing adaptive to the luminance of the video signal while provided with only reference correction amount data corresponding to a video signal level as a predetermined reference. In other words, this means that while luminance nonuniformity can be properly corrected in such a manner as to correspond to the luminance of the video signal, pieces of correction data corresponding to a luminance direction which pieces are equal in number to that of pieces of conventional data do not need to be prepared.

Thus, the present invention makes it possible to prepare, store, and retain only correction amount data (reference correction amount data) for luminance nonuniformity correction which data corresponds to a reference video signal level. Thereby a storage capacity necessary to actually store and retain the correction amount data can be reduced as compared with a case where a plurality of pieces of data, or a certain required number of pieces of data or more corresponding to a brightness (for example luminance) direction are provided. Thus, the capacity of a memory necessary to actually store the correction amount data, for example, can be reduced, thereby resulting in effective reduction in cost. In addition, when the correction amount data is adjusted during manufacturing, for example, it suffices to adjust only a smaller number of pieces of correction amount data corresponding to the luminance direction than conventional. Therefore an adjustment time is shortened, and thus manufacturing efficiency is improved. Further, such an improvement in manufacturing efficiency also leads to reduction in cost.

BRIEF DESCRIPTION OF THE DRAWINGS

FIG. 8 is a block diagram showing a fundamental configuration for a luminance nonuniformity correction dealing with color image display;

FIGS. 11A and 11B are block diagrams showing an example of suitable arrangement of a luminance nonuniformity correcting unit according to the embodiment and a spatial emphasizing system signal processing unit or the luminance nonuniformity correcting unit and a spatial easing system signal processing unit; and FIG. 12 is a diagram showing an example of configuration of an adjusting jig system for luminance nonuniformity correction.

DETAILED DESCRIPTION OF THE PREFERRED EMBODIMENTS

Figure 1:
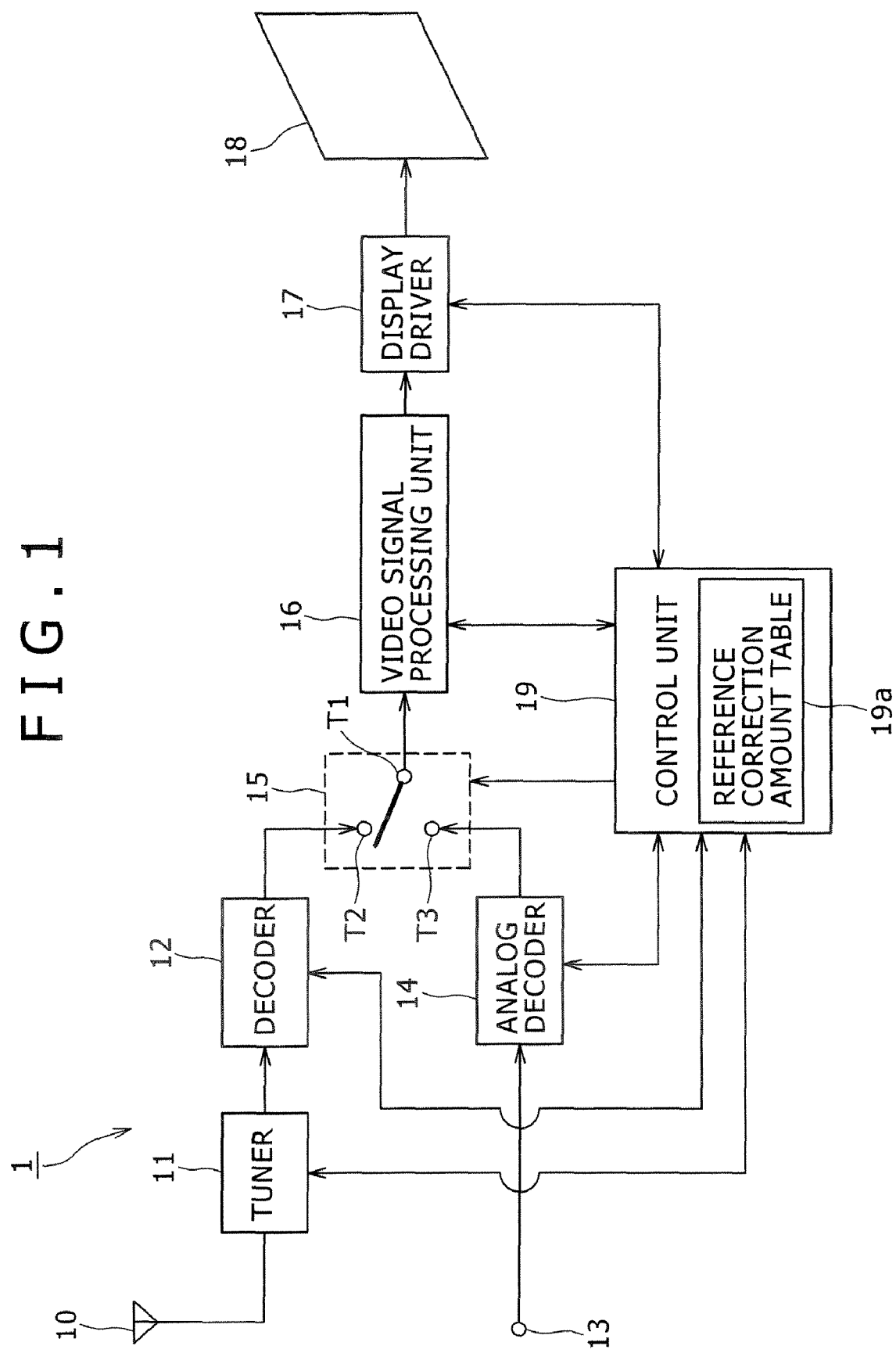
FIG. 1 is a block diagram showing an example of configuration of a television receiver according to an embodiment of the present invention.

FIG. 1 shows a configuration of a television receiver to which a display image correcting device and an image display device according to an embodiment of the present invention are applied.

A broadcast wave received by an antenna 10 in the television receiver 1 shown in FIG. 1 is input to a tuner 11. The tuner 11 subjects the received wave input to the tuner 11 to carrier demodulation and the like. Then, under control of a control unit 19, the tuner 11 extracts and obtains a video signal of a specified channel, and outputs the video signal to a decoder 12. The decoder 12 performs a demodulation process for descrambling the video signal input to the decoder 12 when the video signal is scrambled, for example. In the present embodiment, since a video signal processing unit 16 in a subsequent stage is configured to perform video signal processing by digital signal processing, a digital video signal is output from the decoder 12.

In this case, a video input terminal 13 is provided to allow input of a video signal output from an external video device or the like. The video signal in a predetermined format which signal is input to the video input terminal 13 is input to an analog decoder 14. When the video signal input to the analog decoder 14 is an analog signal in a predetermined format, the analog decoder 14 converts the analog signal into a digital video signal in a predetermined format.

The digital video signal output from the decoder 12 is output to a terminal T2 of a switch 15, whereas the digital video signal output from the analog decoder 14 is output to a terminal T3 of the switch 15. The switch 15 is provided for selection of an input video source. Under control of the control unit 19, the switch 15 performs switching such that one of the terminals T2 and T3 is connected to a terminal T1. With the terminal T2 connected to the terminal T1, the digital video signal output from the decoder 12 is input to the video signal processing unit 16. That is, a broadcast program obtained by reception and channel selection is selected as an input video source. With the terminal T3 connected to the terminal T1, the digital video signal output from the analog decoder 14 is input to the video signal processing unit 16. That is, the video signal input from the external device is selected as an input video source.

The video signal processing unit 16 performs various kinds of signal processing required, including a resolution conversion that converts the number of pixels of the input digital video signal to the number of pixels of a display panel of a liquid crystal display unit 18, an image quality adjustment, and the like. In addition, the video signal processing unit 16 performs correction processing on the video signal to correct for image luminance nonuniformity.

The video signal output from the video signal processing unit 16 is input to a display driver 17. The display driver 17 display-drives the liquid crystal display unit 18 using the input video signal. Thereby an image corresponding to the video signal is displayed on a display screen of the liquid crystal display unit 18.

The liquid crystal display unit 18 is an image displaying part formed with a liquid crystal as a display device.

Incidentally, an actual television receiver can reproduce and output sound together with the video signal of a received broadcast program or an external input source. However, a sound reproducing system will not herein be shown or described.

The control unit 19 includes a microcomputer formed by combining for example a CPU (Central Processing Unit), a ROM, a RAM and the like with each other. The control unit 19 controls each of the above-described parts and the like in the television receiver 1.

For example, when a video signal broadcast in a state of being scrambled is input to the decoder 12, the control unit 19 can control signal processing for descrambling the video signal.

In addition, the control unit 19 for example performs control so as to subject the input video signal to signal processing adapted to different systems of standard resolution (SD: Standard Definition) and high image quality resolution (HD: High Definition) of high-definition television or the like.

Further, the control unit 19 performs switching control on the switch 15 when a broadcast source is to be displayed or when an input source from the video input terminal 13 is to be displayed, according to an operation of selecting a video source, for example, as described above.

Further, the control unit 19 controls the analog decoder 14 such that a proper digital signal conversion process is performed according to the HD/SD system or the like of the signal input from the video input terminal 13.

Further, the control unit 19 controls the video signal processing unit 16 for required signal processing operations including the above-described resolution conversion, image quality adjustment, luminance nonuniformity correction, and the like.

For luminance nonuniformity correction, in particular, the present embodiment uses the information of a reference correction amount table 19a retained in a nonvolatile storage area (for example a storage area in a ROM, an EEPROM, a flash memory or the like) provided within the control unit 19. As described above, the reference correction amount table is two-dimensional correction data for one set which data represents values of amounts of correction of reference correction points in a screen two-dimensional direction in correspondence with one reference luminance.

When signal processing for luminance nonuniformity correction is performed, the control unit 19 transfers data of amounts of correction of reference correction points necessary to obtain an amount of three-dimensional correction, which data is obtained from the reference correction amount table 19a, to the video signal processing unit 16 in accordance with timing of the processing for the luminance nonuniformity correction in the video signal processing unit 16. Incidentally, as will be described later, data of an amount of three-dimensional correction refers to data of an amount of correction having a component of an amount of correction in a luminance (brightness) direction in addition to two dimensions of a horizontal/vertical direction of the screen. With a constitution to be described later and the like, the video signal processing unit 16 obtains data of an amount of three-dimensional correction using the data of the amounts of correction of the reference correction points, and corrects the video signal on the basis of the data of the amount of three-dimensional correction, thereby achieving the processing for the luminance nonuniformity correction. Incidentally, a configuration is conceivable in which the amount of three-dimensional correction is obtained by for example arithmetic processing of the CPU in the control unit 19, and is then transmitted to a signal processing system for the luminance nonuniformity correction in the video signal processing unit 16. However, processing for obtaining an amount of three-dimensional correction from an amount of two-dimensional correction is relatively heavy processing, and therefore a certain amount of processing load or more may be imposed on the microcomputer of the control unit 19. Accordingly, in consideration of such a case, the present embodiment makes the video signal processing unit 16 perform the processing for obtaining the amount of three-dimensional correction.

Luminance nonuniformity correction according to the present embodiment will next be described.

In general, luminance nonuniformity refers to nonuniformity of luminance when an image displayed on a display screen is observed in a two-dimensional direction. In order to correct for this luminance nonuniformity, correction data having an amount of correction adjusted according to a state of luminance nonuniformity in the actual image is created. This correction data is stored and retained in a device such as a display device or the like. Then, the device such as a display device or the like calls the correction data stored and retained therein, and corrects the video signal. As a result, the luminance level of the video signal is adjusted so as to cancel the luminance nonuniformity, and the displayed image is actually corrected for the luminance nonuniformity.

General description will be made below of correction data for correcting for luminance nonuniformity.

Luminance nonuniformity is nonuniformity of luminance in a two-dimensional space in a horizontal/vertical direction of an image displayed on the display screen. Therefore correction data indicating an amount of correction corresponding to the two-dimensional space is required. Such two-dimensional correction data will be described with reference to FIG. 2.

Figure 2:
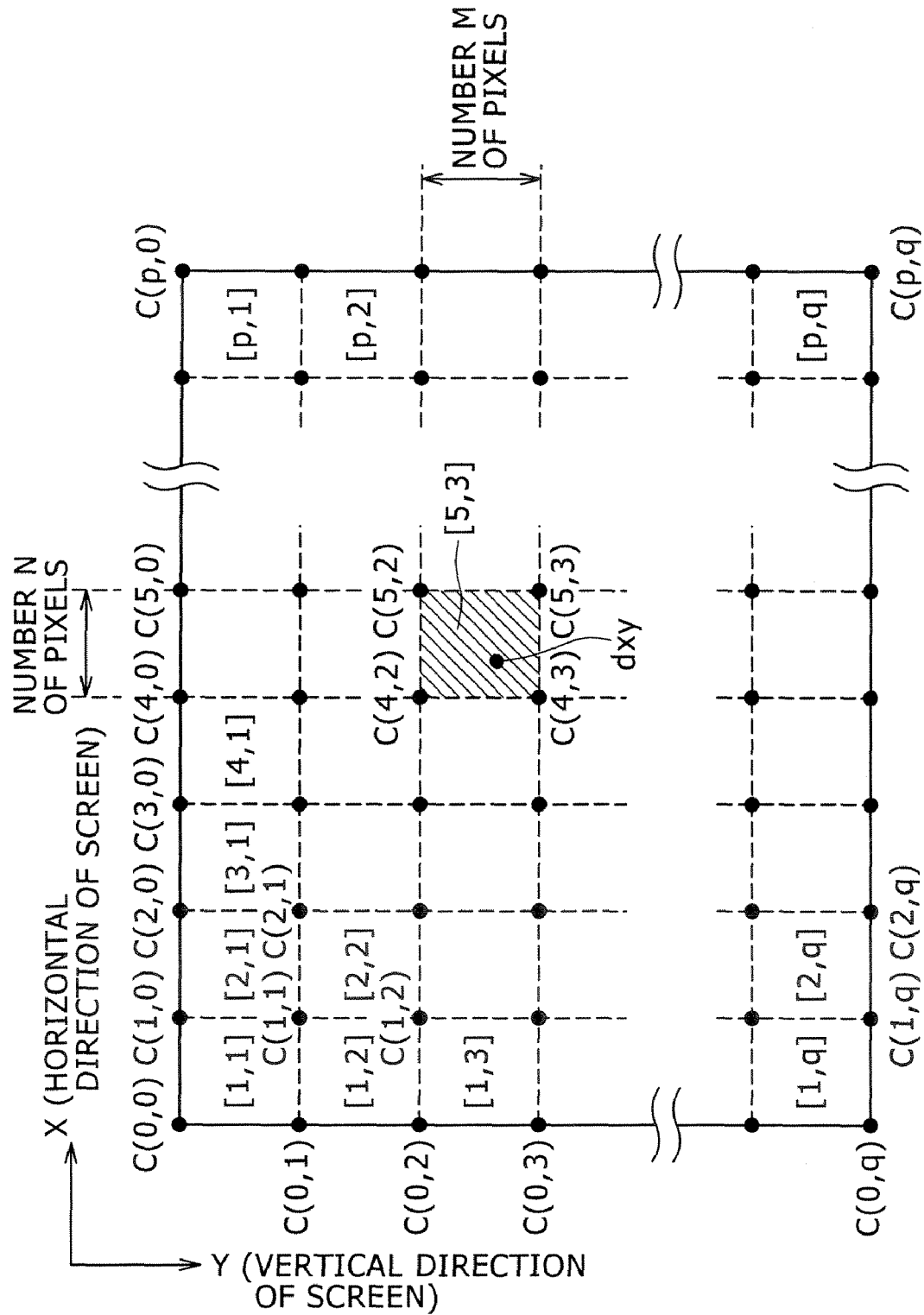
FIG. 2 is a diagram of assistance in explaining the concept of a reference correction amount table according to the present embodiment and the concept of generation of two-dimensional correction amount data corresponding to a pixel on the basis of reference two-dimensional correction amount data.

As shown in FIG. 2, in obtaining two-dimensional correction data, a two-dimensional space as one display screen (image) is divided by dividing lines set in correspondence with predetermined pixel count units (N and M) in an X-direction (horizontal direction) and a Y-direction (vertical direction) of the image. Next, in such a manner as to correspond to a contour line of the screen and the dividing lines in the horizontal (X)/vertical (Y) direction on the display screen, coordinates zero to p are given in the X-direction, and coordinates zero to q are given in the Y-direction, as shown in FIG. 2. Reference correction points represented as C(0,0), C(0,1) ... C(p, q) are set for respective intersections of these coordinates. In this case, (p+1)×(q+1) reference correction points are set. Then, for example, under a luminance level of a video signal of a certain condition, luminance is measured at each of the reference correction points set as described above on the display screen, and an amount of correction for each reference correction point is set according to a result of the measurement. A two-dimensional set of amounts of correction thus set forms two-dimensional correction data corresponding to one luminance level.

Then, the two-dimensional correction data being obtained by using the thus obtained data, luminance nonuniformity is corrected with a pixel unit forming the displayed image shown in FIG. 2 as a correction point.

For this, a square space area (inter-reference correction point area) formed by connecting four reference correction points adjacent to each other in the horizontal direction and the vertical direction of the display screen shown in FIG. 2 is divided and set. On the basis of the fact that (p×q) inter-reference correction point areas are formed, the inter-reference correction point areas are represented by [1,1], [1,2] ... [p,q] in this case.

As an example, luminance nonuniformity is corrected with a pixel dxy present within the inter-reference correction point area [5,3] in FIG. 2 as a correction point. For this, distances from the reference correction points C(4,2), C(5,2), C(4,3), and C(5,3) forming the inter-reference correction point area [5,3] to the pixel dxy are determined first, for example. Then, weights are assigned to the respective amounts of correction of the reference correction points C(4,2), C(5,2), C(4,3), and C(5,3) according to the determined distances, and a predetermined operation is performed, whereby an amount of correction at the position of the pixel dxy is obtained. That is, the amount of correction at the correction point of the pixel dxy is obtained by interpolation using the respective amounts of correction of the reference correction points C(4,2), C(5,2), C(4,3), and C(5,3). On the basis of the thus obtained amount of correction, the luminance level of a sample of the video signal corresponding to the pixel dxy is corrected. Thereby display is made at the pixel dxy with such a luminance as to cancel the luminance nonuniformity.

Figure 3:
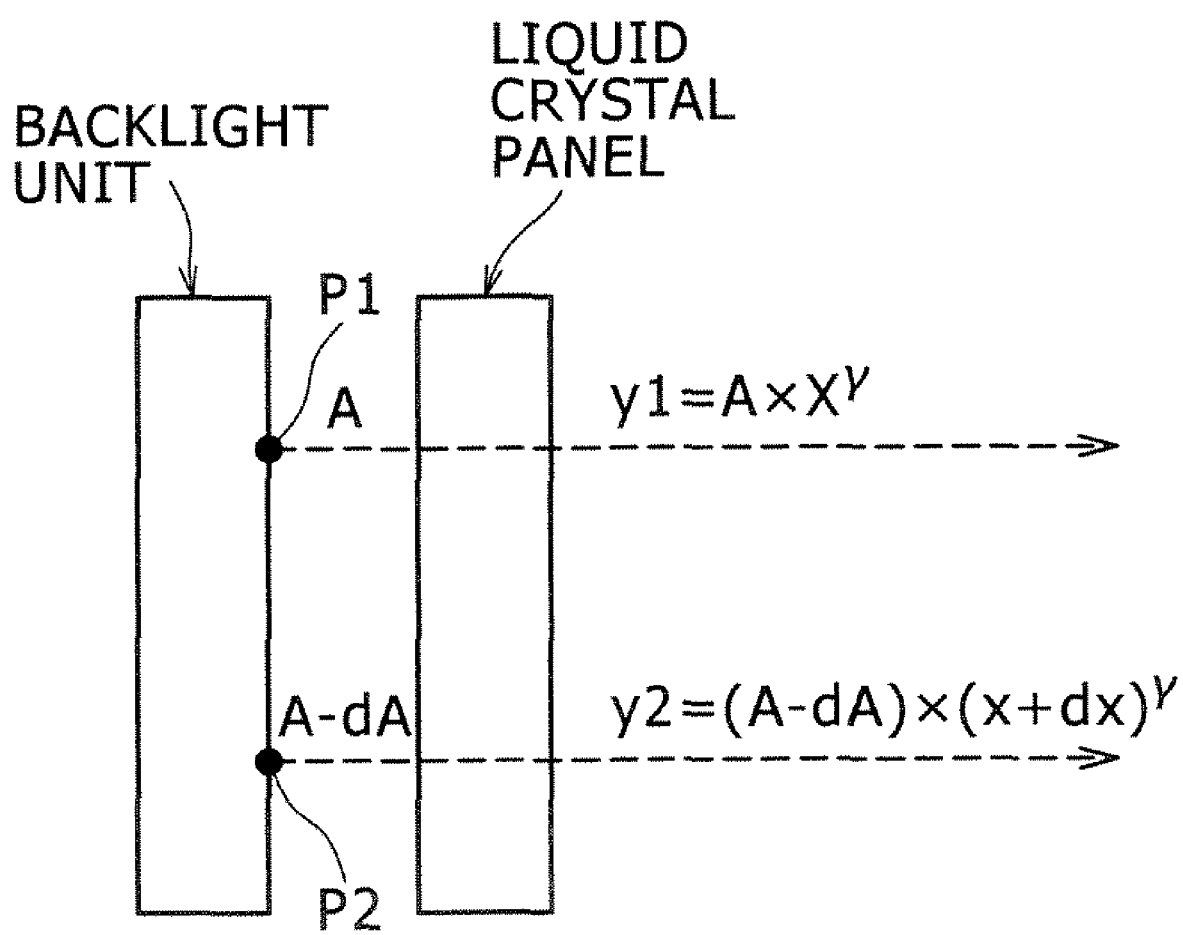
FIG. 3 is a diagram showing relation between nonuniformity of light emission luminance of a backlight unit and correction of luminance nonuniformity observed after transmission of a liquid crystal panel.

FIG. 3 schematically shows the structure of a liquid crystal display device corresponding to the liquid crystal display unit 18 in the present embodiment. As described earlier, the liquid crystal display device includes a liquid crystal panel and a backlight unit disposed on the back side of the liquid crystal panel. Consideration will be given to correction of luminance nonuniformity of the liquid crystal display device using the two-dimensional correction data described with reference to FIG. 2.

The backlight unit being perceived as one light source having a plane shape corresponding to the shape of the liquid crystal panel, light emitting positions P1 and P2 of the two-dimensional plane light source are assumed. Suppose that light is emitted at a luminance (light emission luminance) A at the light emitting position P1, whereas light is emitted at a luminance (light emission luminance) A−dA at the light emitting position P2. That is, when the light emitting position P1 is regarded as a reference, the light emitting position P2 has an error of light emission luminance as a quantity denoted by −dA.

The light having the light emission luminances A and A−dA which light is emitted from the light emitting positions P1 and P2 passes through the LCD panel to be observed as luminance (observed luminance) y. This observed luminance y is expressed by the following Equation 1 using an exponent γ based on the transmittance of the liquid crystal panel and a drive voltage x applied to drive the liquid crystal panel.

$$y = x^\gamma \quad \text{[Equation 1]}$$

On the basis of Equation 1, observed luminance y1 corresponding to the light emission position P1 with the light emission luminance A and observed on the liquid crystal panel is expressed by the following Equation 2.

$$y1 = Ax^\gamma \quad \text{[Equation 2]}$$

Since light is emitted at the other light emitting position P2 at the light emission luminance A−dA, the light emitting position P2 has an error of light emission luminance of −dA with respect to the light emission luminance A of the light emitting position P1. A light emission luminance difference of −dA between the light emitting positions P1 and P2 appears as a difference between the observed luminances, that is, luminance nonuniformity obtained as a result of the passage of the light through the liquid crystal panel. Accordingly, when the observed luminance corresponding to the light emitting position P2 is to be corrected so as to equal the observed luminance corresponding to the light emitting position P1, a voltage represented by x+dx, which voltage is obtained by adding an amount of correction dx to the drive voltage x, is applied. Observed luminance y2 corresponding to the light emitting position P2 which luminance is obtained by making such a correction is expressed by the following Equation 3.

$$y2 = (A - dA)(x + dx)^\gamma \quad \text{[Equation 3]}$$

The luminance nonuniformity correction in this case means making the observed luminances y1 and y2 equal to each other. On the basis of this, from the above Equations 2 and 3, the following Equation 4 holds.

$$Ax^\gamma = (A - dA)(x + dx)^\gamma \quad \text{[Equation 4]}$$

When the above Equation 4 is solved for dx, the following Equation 5 is obtained.

$$dx = \left(\left(1 / \left((1 - dA/A)^{\frac{1}{\gamma}}\right)\right) - 1\right)x \quad \text{[Equation 5]}$$

Further, letting dx(max) be an amount of correction of the drive voltage corresponding to the light emitting position P2, the amount of correction being obtained when a setting is made such that the drive voltage x=1, the above Equation 5 is expressed by the following Equation 6.

$$dx(\max) = \left(1 / \left((1 - dA/A)^{\frac{1}{\gamma}}\right)\right) - 1 \quad \text{[Equation 6]}$$

From relation between the above Equations 6 and 5, the amount of correction dx of the drive voltage is expressed by the following Equation 7.

$$dx = dx(\max) \times x \quad \text{[Equation 7]}$$

This Equation 7 indicates that the amount of correction dx is proportional to the drive voltage x.

As described above, in theory, the amount of correction dx for each luminance is proportional to the drive voltage x. However, it is known that in practice, a good result is not necessarily obtained when the correction is made based on Equation 7.

One reason is that there is a limit to resolution when digital signal processing is performed on the video signal.

In addition, the correction between the observed luminances y1 and y2 described above simply deals with only luminance for simple and understandable description, and therefore one kind of variable corresponds to observed luminance y. However, an actual image normally displayed is a color image. Since the luminance nonuniformity of a color image causes nonuniformity of chromaticity, correction for nonuniformity of chromaticity is considered in luminance nonuniformity correction. In correction for nonuniformity of chromaticity, luminance (brightness) corresponding to each of a plurality of kinds of signal components used for color image display needs to be corrected. Therefore, a plurality of variables are provided to correspond to the plurality of kinds of signal components. When an image is displayed on the basis of three kinds of signals corresponding to three primary colors R, G, and B, for example, a normal way of thinking suggests that brightness or intensity (luminance) of each of the colors R, G, and B should be corrected, and correspondingly three kinds of variables are necessary to correct the level of each of an R, a G, and a B video signal.

In addition, it is difficult to express the transmittance of an actual liquid crystal panel simply by an equation with an exponent γ according to theory.

Figure 4:
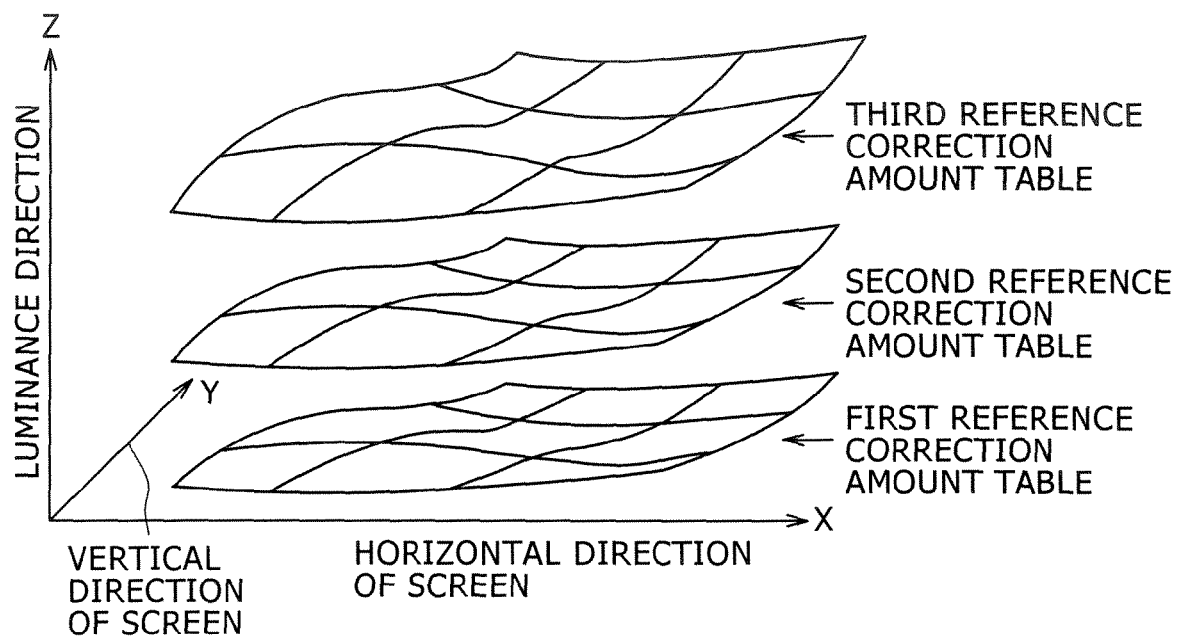
FIG. 4 is a diagram of assistance in explaining the concept of formation of reference correction amount data for luminance nonuniformity correction.

Because of the several situations described above, for actual luminance nonuniformity correction, a plurality of sets of two-dimensional correction data as described with reference to FIG. 2 are provided so as to correspond to each luminance. FIG. 4 schematically shows the structure of such correction data.

As shown in FIG. 4, a three-dimensional space is set for correction data in the horizontal direction (X-direction) of the screen, in the vertical direction (Y-direction) of the screen, and a luminance (brightness) direction (Z-direction). The set of two-dimensional correction data shown in FIG. 2 can be regarded as a table structure of amounts of correction as references corresponding to the horizontal/vertical direction of the screen, and is referred to as a "reference correction amount table" in this figure. In this case, an example is shown in which a first to a third reference correction amount table are provided in correspondence with three different luminances.

At a time of correction processing, an interpolation operation is performed using information of appropriate amounts of correction in the first to third reference correction amount tables on the basis of a pixel position in the two-dimensional direction and a luminance level (corresponding to the level of the drive voltage) in the luminance (brightness) direction, thereby an amount of correction is determined, and then the correction processing is performed on the video signal.

Figure 5:
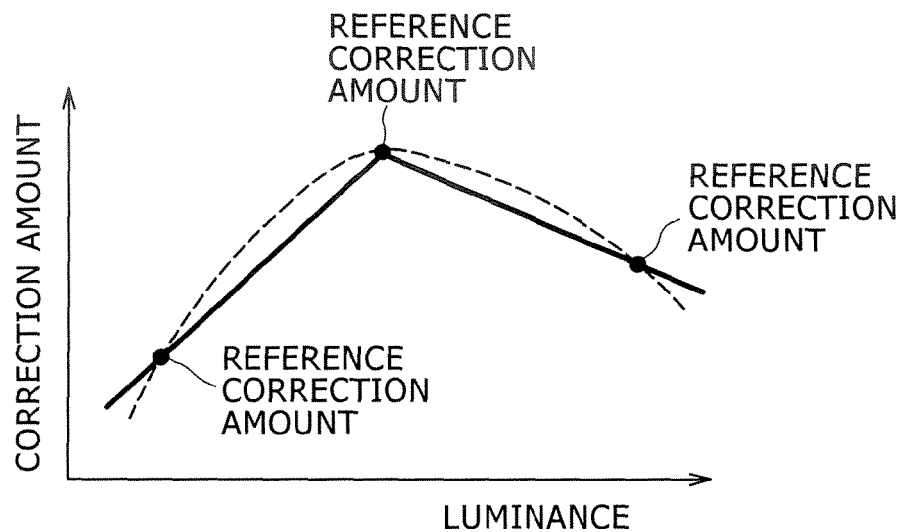
FIG. 5 is a diagram of assistance in explaining the concept of interpolation processing for obtaining correction amount data using reference correction data.

Incidentally, as interpolation processing methods, there are an interpolation performed linearly as represented by a solid line in FIG. 5 and an interpolation performed on the basis of a curve by a predetermined high-order function, for example, as represented by a broken line in FIG. 5.

The television receiver 1 according to the present embodiment has the liquid crystal display unit 18 as a display part as described above with reference to FIG. 1. That is, the television receiver 1 according to the present embodiment employs a liquid crystal display device.

As is well known, the liquid crystal display device includes a liquid crystal panel (display panel) composed of a liquid crystal layer and a driving circuit system for driving the liquid crystal of the liquid crystal layer, and a backlight unit serving as a light source for irradiating the back surface side of the liquid crystal panel with light.

The backlight unit employed in the liquid crystal display unit 18 according to the present embodiment has LEDs (Light Emitting Diodes) of three primary colors R (red), G (green), and B (blue) arranged on the back surface side of the liquid crystal panel to irradiate the back surface side of the liquid crystal panel with white light. While cold-cathode tubes have heretofore been widely employed as a backlight, LEDs are employed as a backlight against a backdrop of for example improvement in luminous efficiency of LEDs, which improvement has allow LEDs to be put to practical use as a backlight. As compared with cold-cathode tubes, LEDs are advantageous in that LEDs are environmentally friendly because mercury is not used as a material, LEDs can be driven by a low voltage, and LEDs have good temperature characteristics and good response characteristics, for example.

However, the following problems regarding luminance nonuniformity and luminance nonuniformity correction become noticeable when LEDs are used as a backlight unit as in the present embodiment.

When LEDs are formed as a backlight unit, a required number of LEDs are arranged two-dimensionally in a predetermined pattern on the back surface side of the liquid crystal panel. Then, the back surface side of the liquid crystal panel is irradiated by a two-dimensional irradiation light area obtained by a set of these LEDs.

However, since each LED can be regarded as a point source of light, the above-described structure obtains the two-dimensional irradiation light area by a set of point sources of light. Therefore a state of occurrence of luminance nonuniformity corresponds to intervals of the arranged LEDs. This means that a pitch of luminance nonuniformity is rather small as compared with a case where cold-cathode tubes are employed as a backlight, for example.

When a backlight unit is formed by cold-cathode tubes, the backlight unit is formed by for example arranging a required number of cold-cathode tubes in the vertical direction of the screen such that the longitudinal direction of the cold-cathode tubes coincides with the horizontal direction of the screen. Alternatively, light of one cold-cathode tube along one of the horizontal direction and the vertical direction of the screen is reflected by using a reflector or the like to irradiate the back surface of the liquid crystal panel uniformly. With the former structure, a luminance nonuniformity occurs mainly between cold-cathode tubes arranged adjacent to each other, for example. With the latter structure, luminance nonuniformity is changed according to a distance from the cold-cathode tube.

It is thus understood that in either structure of the backlight employing cold-cathode tubes, the cold-cathode tubes are of a shape having a longitudinal direction and are thus linear light sources, so that a pitch of luminance nonuniformity is larger than when LEDs are employed.

Consideration will be given to making correction for luminance nonuniformity dealing with a decrease in pitch of luminance nonuniformity as a result of employment of an LED backlight unit or the like as described above. Correction points per set of two-dimensional correction data (reference correction amount table) shown in FIG. 2, for example, need to be increased according to the luminance nonuniformity pitch as compared with the case where cold-cathode tubes are employed as a backlight, for example. This means an increase in size of data of amounts of correction forming the reference correction amount table. Specifically, depending on the size and the number of pixels of the liquid crystal panel, the number of inter-reference correction point areas (FIG. 2) obtained by dividing the whole of the image in the horizontal direction and the vertical direction, the number of inter-reference correction point areas being required according to the luminance nonuniformity pitch, is about 30×16 or 60×33. In a conventional method, a plurality of sets of such reference correction amount tables are provided in correspondence with the luminance (brightness) direction, and therefore the size of data for correcting for luminance nonuniformity is considerably enlarged.

When the size of the data for the luminance nonuniformity correction is increased, the storage capacity of a memory for storing and retaining the data, for example, needs to be increased, thus inviting a corresponding increase in cost. In addition, since the data of amounts of correction is increased, it takes more time to adjust the correction amount data during manufacturing or the like, thus causing a decrease in manufacturing efficiency.

When LEDs are employed as a backlight and the luminance nonuniformity pitch becomes smaller, such problems become noticeable and cannot be ignored.

Accordingly, as will be described below, the present embodiment employs a constitution for luminance nonuniformity correction that can provide at least correction effects similar to conventional correction effects while reducing the size of required correction data.

For this, the present embodiment has only one set of two-dimensional correction data shown in FIG. 2 (reference correction amount table) corresponding to a specific luminance. In other words, the present embodiment does not have a plurality of sets of reference correction amount tables corresponding to the luminance (brightness) direction. Incidentally, the reference correction amount table having this structure is retained in a predetermined storage unit provided in the control unit 19 as the reference correction amount table 19a shown in FIG. 1, for example.

However, as described earlier, it is difficult in practice to realize proper luminance nonuniformity correction on the basis of correction amount data composed of only one set of a reference correction amount table. The present embodiment solves this problem by employing configurations shown in FIGS. 6A and 6B or FIGS. 7A and 7B.

Figure 6A:
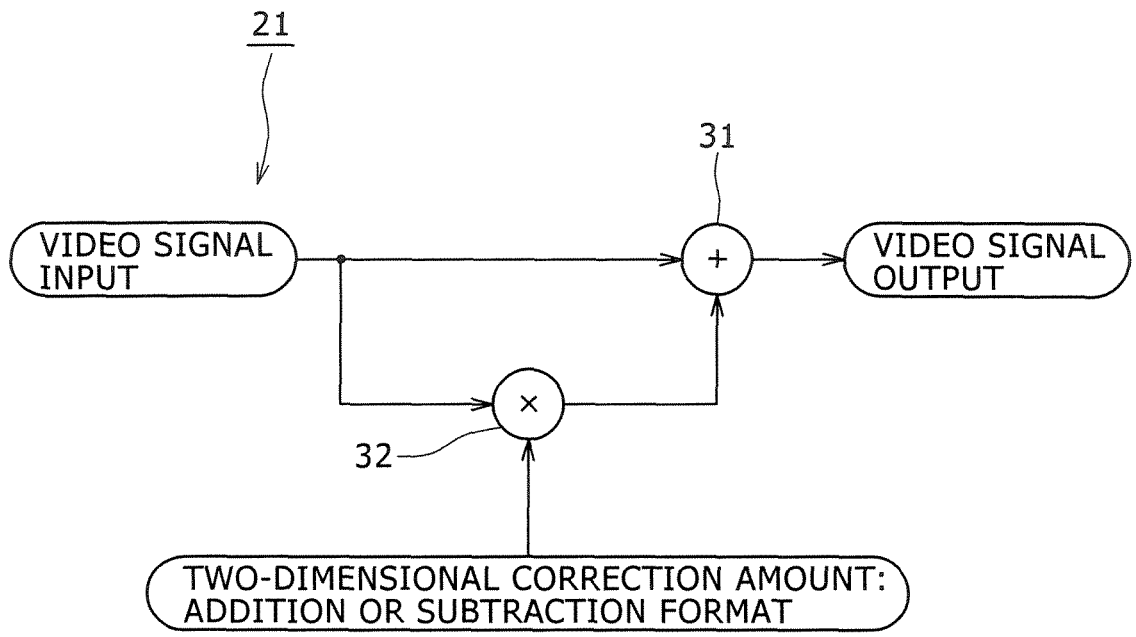
FIGS. 6A and 6B are block diagrams showing an example of configuration of a correction circuit unit that obtains a three-dimensional correction amount by setting two-dimensional correction amount data in linear proportion.
Figure 6B:
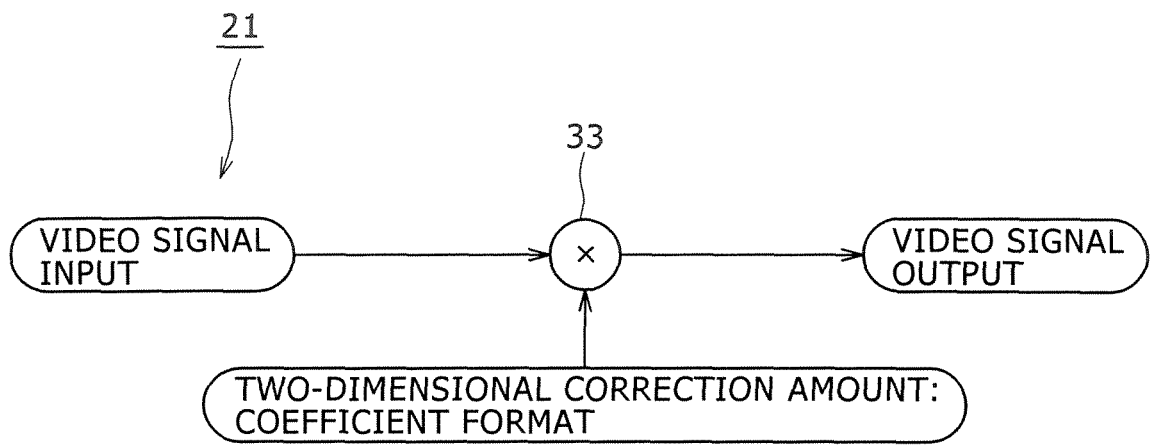

FIGS. 6A and 6B show an example of configuration of a correction circuit unit 21 provided for luminance nonuniformity correction in the television receiver 1 according to the present embodiment. In the configuration of FIG. 1, this correction circuit unit 21 is provided in a predetermined signal processing stage in the video signal processing unit 16. The correction circuit unit 21 in practice has a configuration corresponding to digital signal processing, and a video signal input to be corrected is processed in the form of a digital signal.

Consideration will be given to reference correction amount data having amounts of correction in an addition or subtraction format in which the video signal is corrected by addition or subtraction and reference correction amount data in a coefficient format in which the video signal is corrected by multiplication of a gain coefficient, as reference correction amount data forming two-dimensional correction data (reference correction amount table 19a).

FIG. 6A shows an example of configuration of a correction circuit unit 21 corresponding to an amount of correction in an addition format. The correction circuit unit 21 includes an adder 31 for adding and outputting an input signal (data), and a multiplier 32 for multiplying and outputting the input signal.

The video signal to be corrected branches off to be input to the adder 31 and the multiplier 32. The multiplier 32 multiplies the video signal to be corrected by the data of an amount of correction. The multiplier 32 outputs a result of the multiplication to the adder 31. The data of the amount of correction input to the multiplier 32 is obtained by interpolation using reference correction amount data forming the reference correction amount table according to a pixel position corresponding to the video signal to be corrected. Hence, the amount of correction has a component for only the two-dimensional direction corresponding to a specific luminance, and does not have a component corresponding to a three-dimensional direction (luminance (brightness) direction). Such an amount of correction will be referred to as an "amount of two-dimensional correction".

The adder 31 adds together the video signal to be corrected and the operation output of the multiplier 32, and outputs a result of the addition. The output of the adder 31 is a video signal after correction processing.

In the above configuration, the multiplier 32 multiplies together the video signal and the data of the amount of two-dimensional correction. Thus, the amount of correction to be directly added or subtracted to or from the original video signal according to the level (luminance or brightness) of the video signal is obtained. That is, the amount of correction output from the multiplier 32 is obtained by adding a correction amount component corresponding to the luminance of the video signal to be corrected to the amount of two-dimensional correction before being input to the multiplier 32. That is, the amount of correction output from the multiplier 32 is data of an amount of three-dimensional correction having correction amount components in the horizontal direction (X-direction) of the screen, the vertical direction (Y-direction) of the screen, and the luminance (brightness) direction (Z-direction) described with reference to FIG. 4. Then, the adder 31 adds the amount of three-dimensional correction to the original video signal, whereby the corrected video signal is obtained.

FIG. 6B shows an example of configuration of a correction circuit unit 21 corresponding to an amount of two-dimensional correction in a coefficient format.

This correction circuit unit 21 multiplies together the video signal to be corrected and the data of an amount of two-dimensional correction in the coefficient format by means of a multiplier 33, whereby a video signal after correction processing is obtained as an output of the multiplier 33.

Supposing that the data of an amount of two-dimensional correction in the addition or subtraction format in the correction circuit unit 21 shown in FIG. 6A is 10 bits, for example, the amount of correction can assume a value in a range of zero to 1023. Incidentally, a negative amount of correction can be represented by a complement, for example. Supposing that as a concrete example, a value represented by the 10-bit data of an amount of two-dimensional correction is +102, this means an addition of a value that is substantially 10% of a full scale of video signal level. In the configuration of FIG. 6B, on the other hand, when the data of an amount of two-dimensional correction assumes a value representing 1.1 times, the same correction processing result as in the case where the 10-bit data of the amount of two-dimensional correction indicates +102 in the configuration of FIG. 6A can be obtained.

Thus, equal correction results can be obtained with the configurations of FIG. 6A and FIG. 6B. In practice, either of the configurations of FIG. 6A and FIG. 6B may be employed. However, because it suffices for the configuration of FIG. 6B to have one multiplier whereas the configuration of FIG. 6A has one adder and one multiplier, the configuration of FIG. 6B is more advantageous from a viewpoint of reducing circuit scale, cost and the like.

The configuration of the correction circuit unit 21 shown in FIG. 6A obtains the three-dimensional correction data by multiplying together the amount of two-dimensional correction and the video signal to be corrected in the multiplier 32. The thus obtained three-dimensional correction data is obtained by making the amount of two-dimensional correction linearly proportional to the level (luminance) of the video signal to be corrected. The correction circuit unit 21 of FIG. 6B, on the other hand, directly multiplies the video signal to be corrected by the data of the amount of two-dimensional correction in the form of a gain. As described above, the correction circuit unit 21 of FIG. 6B provides a processing result similar to that of the circuit of FIG. 6A. It can therefore be said that the correction circuit unit 21 of FIG. 6B also obtains an amount of three-dimensional correction by making the amount of two-dimensional correction linearly proportional to the level (luminance) of the video signal to be corrected, and corrects the video signal on the basis of the data of the amount of three-dimensional correction.

However, as is understood from the description above with reference to FIG. 3, because of factors including the problem of the transmittance of the liquid crystal panel, for example, the luminance y observed on the display screen tends to have a nonlinear characteristic with respect to the level (brightness or luminance) of the original video signal. Hence, it is preferable that in obtaining the amount of three-dimensional correction, the correction circuit unit 21 make the amount of two-dimensional correction nonlinearly proportional to the level of the video signal to be corrected, because a better correction result can be expected.

Figure 7A:
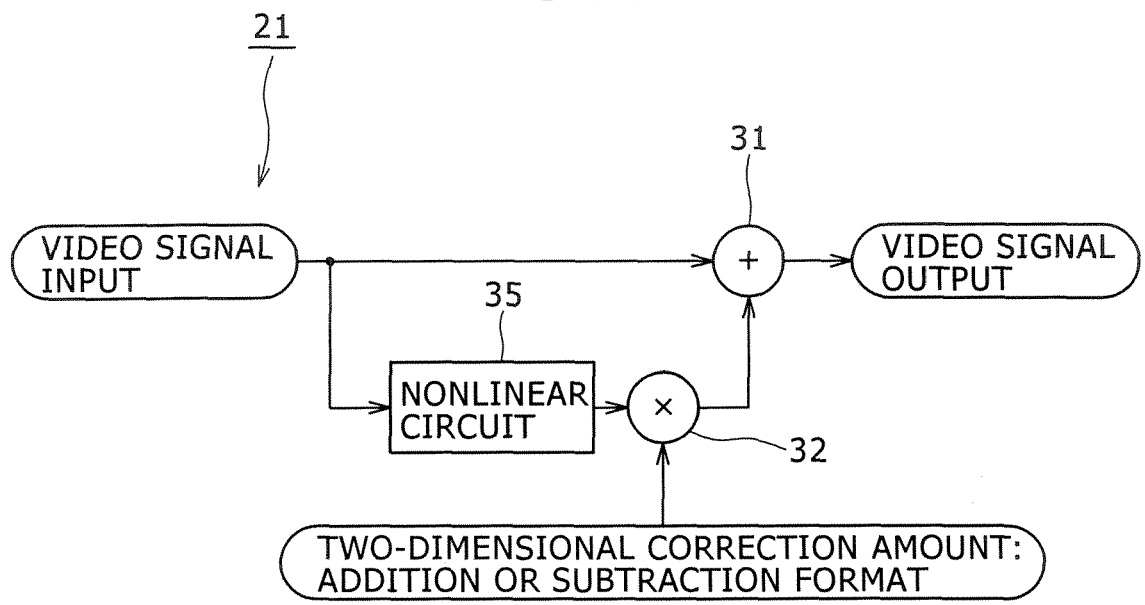
FIGS. 7A and 7B are block diagrams showing an example of configuration of a correction circuit unit that obtains a three-dimensional correction amount by setting two-dimensional correction amount data in nonlinear proportion.
Figure 7B:
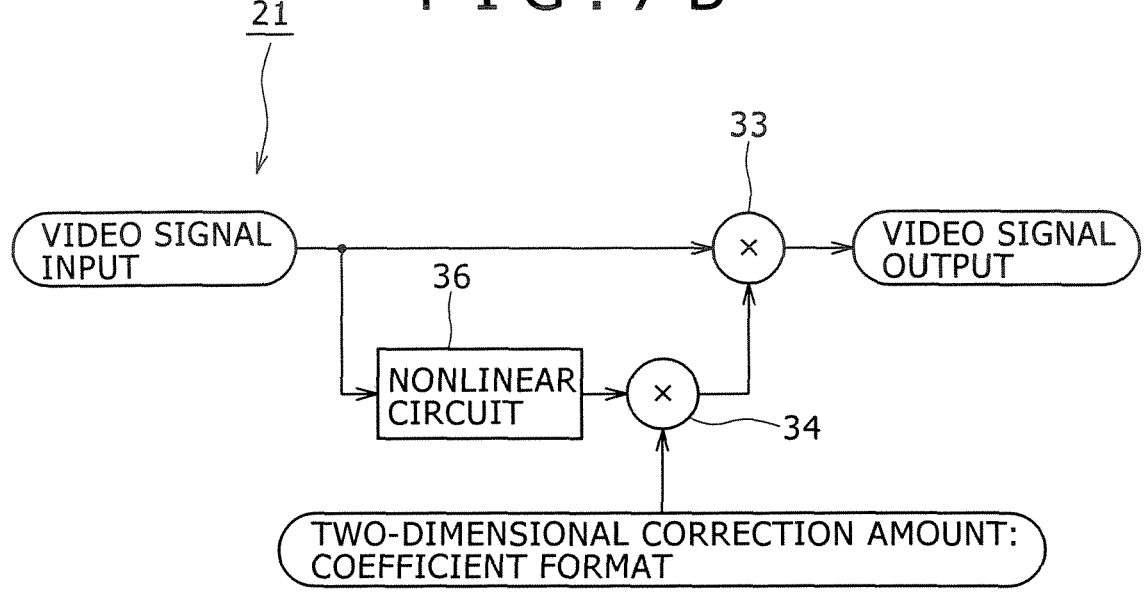

FIGS. 7A and 7B show an example of configuration of a correction circuit unit 21 that makes luminance nonuniformity correction on the basis of an amount of three-dimensional correction obtained by making an amount of two-dimensional correction nonlinearly proportional to the level of a video signal to be corrected.

FIG. 7A shows a configuration in the case of an amount of two-dimensional correction in the addition or subtraction format. The configuration shown in FIG. 7A is formed by adding a nonlinear circuit 35 to the configuration shown in FIG. 6A. The nonlinear circuit 35 is provided to be supplied with a video signal to be corrected in an input stage of a multiplier 32.

The nonlinear circuit 35 has a ROM or the like as hardware, for example. The nonlinear circuit 35 retains a nonlinear response characteristic with respect to the level (luminance) of the video signal. The nonlinear circuit 35 gives a level according to the retained nonlinear characteristic to the input video signal, and then outputs the video signal to the multiplier 32. Thereby the data of an amount of three-dimensional correction as an output of the multiplier 32 has a value obtained by making an amount of two-dimensional correction nonlinearly proportional to the luminance.

FIG. 7B shows a configuration in the case of an amount of two-dimensional correction in the coefficient format.

The correction circuit unit 21 shown in FIG. 7B is formed by adding a nonlinear circuit 36 and a multiplier 34 to the configuration shown in FIG. 6B. The nonlinear circuit 36 in this case retains a nonlinear characteristic set according to the amount of two-dimensional correction in the coefficient format. On the basis of the nonlinear characteristic, the nonlinear circuit 36 converts the level of a video signal to be corrected, and then outputs the result. Then, the nonlinear circuit 36 outputs the result to the multiplier 34.

The multiplier 34 multiplies the output of the nonlinear circuit 36 by the data of the amount of two-dimensional correction in the coefficient format. Thereby the data of the amount of two-dimensional correction is provided with a nonlinear characteristic according to the level of the video signal to be corrected. Then a multiplier 33 multiplies together the data of the amount of two-dimensional correction provided with the nonlinear characteristic and the video signal to be corrected.

Thus, each of the correction circuit units 21 of FIGS. 7A and 7B makes adaptive luminance nonuniformity correction on the basis of the nonlinear characteristic of the measured luminance y, for example.

In practice, either of the configurations of the correction circuit units 21 shown in FIG. 7A and FIG. 7B may be employed. However, a multiplier generally has a higher circuit scale and requires higher cost than an adder. Accordingly, in consideration of circuit scale and cost, the circuit of FIG. 7A having one multiplier and one adder is more advantageous as an arithmetic unit than the circuit of FIG. 7B having two multipliers.

The actual television receiver 1 according to the present embodiment displays a color image.

In the present situation, known as a common system for displaying a color television image is a system using signals (three primary-color signals) corresponding to three primary colors [R (red), G (green), and B (blue)]. Alternatively, a system is known which uses signals [Y, Cr, and Cb] or [Y, Pr, and Pb] as a combination of a luminance signal and color-difference signals. Thus, for color image display, whichever system is employed, three kinds of video signals of one of the groups [R, G, and B], [Y, Cr, and Cb], and [Y, Pr, and Pb] are used.

When the television receiver 1 according to the present embodiment displays a color image by the above-described systems for color image display, a fundamental configuration for luminance nonuniformity correction which configuration is provided in the television receiver 1 is shown in FIG. 8, for example.

FIG. 8 shows a luminance nonuniformity correcting unit 20 as a circuit part for correcting luminance nonuniformity. The luminance nonuniformity correcting unit 20 has three correcting circuit units 21A, 21B, and 21C corresponding to an R, a B, and a G video signal. These correcting circuit units 21A, 21B, and 21C have the configuration of the correction circuit unit 21 shown in one of FIGS. 6A and 6B and FIGS. 7A and 7B.

In the configuration shown in FIG. 8, the R, B, and G video signals corresponding to the [R, G, and B] system, for example, are input to the respective correcting circuit units 21A, 21B, and 21C. In addition, two-dimensional correction amount data for correcting luminance nonuniformity which data corresponds to the colors R, B, and G is input to the respective correcting circuit unit 21A, 21B, and 21C. That is, for color image display, correction signal processing systems having the correcting circuit units 21A, 21B, and 21C corresponding to the R, B, and G video signals, respectively, are provided, and three pieces of two-dimensional correction amount data (three reference correction amount tables) as shown in FIG. 2 which data is created in correspondence with the correction processing systems for the R, G and B video signals, for example, are retained.

Also in a case where a system such as the [Y, Cr, and Cb] system, the [Y, Pr, and Pb] system or the like other than the [R, G, and B] system is employed as a color image display system, the luminance nonuniformity correcting unit 20 has correction processing systems having the correcting circuit units 21A, 21B, and 21C in correspondence with the respective video signals, and two-dimensional correction amount data for correcting luminance nonuniformity is prepared and retained in correspondence with the display components of the video signals. The two-dimensional correction amount data corresponding to the input video signals to be corrected is input to the correcting circuit units 21A, 21B, and 21C.

For confirmation, in the past, to correct the luminance nonuniformity of a color image requires a plurality of pieces of two-dimensional correction amount data (reference correction amount tables) corresponding to the luminance (brightness) direction for each of the three kinds of video signals. In the present embodiment, only one piece of two-dimensional correction amount data (reference correction amount table) corresponding to each of three kinds of video signals is sufficient, and therefore an effect of reducing the size of data for luminance nonuniformity correction is not ruined.

However, requiring two-dimensional correction amount data (reference correction amount table) for each of a plurality of kinds of video signals for color image display as described above means that from an absolute viewpoint, the size of data for luminance nonuniformity correction is increased greatly according to the number of kinds of video signals. Accordingly, it is more desirable to employ a configuration that corrects the luminance nonuniformity of a color image with a smaller number of reference correction amount tables, because the size of data for luminance nonuniformity correction is further reduced.

Figure 9:
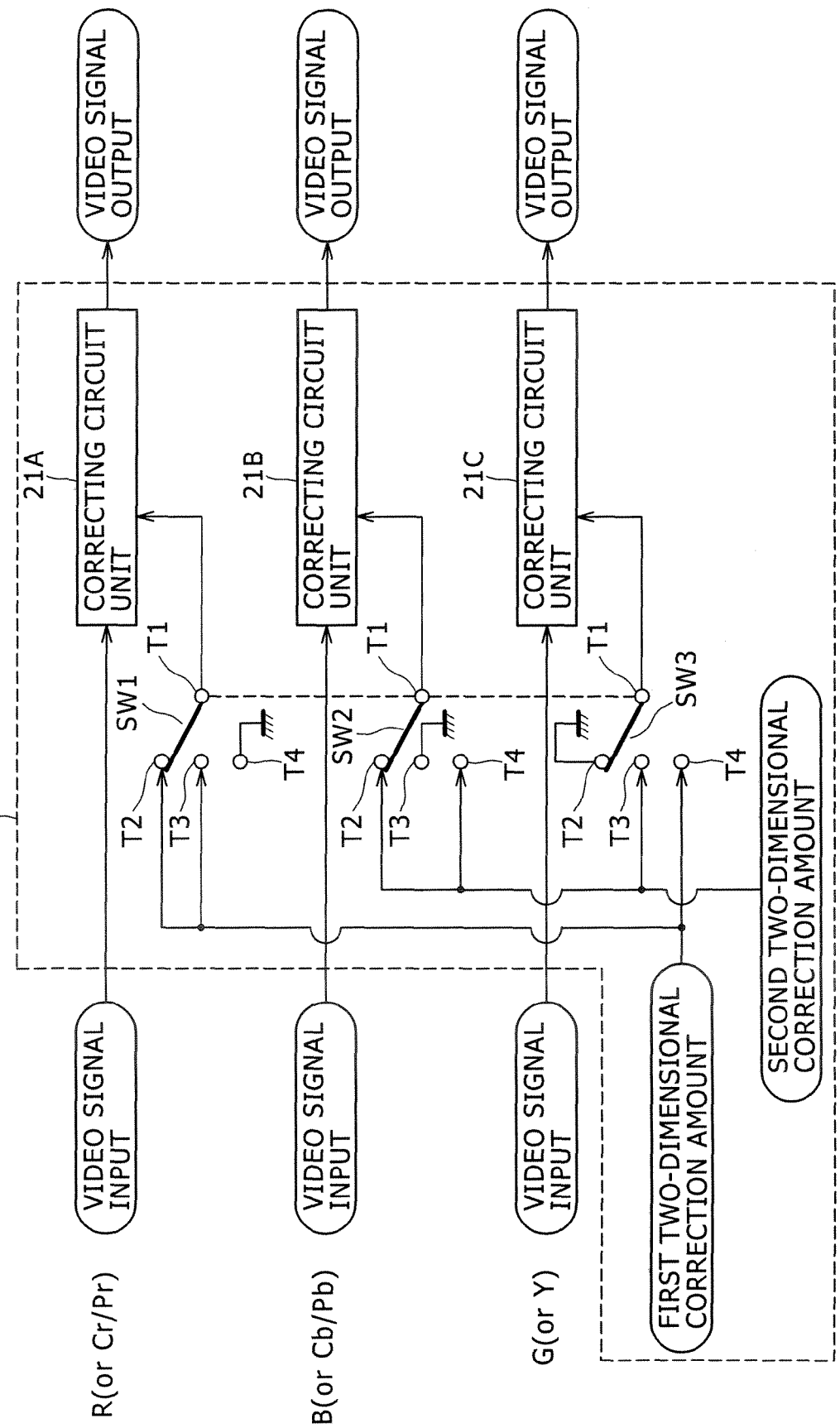
FIG. 9 is a block diagram showing a fundamental configuration for a luminance nonuniformity correction dealing with color image display on the basis of a reference correction amount table corresponding to two kinds of video signals.

Accordingly, the television receiver 1 according to the present embodiment in practice employs a configuration shown in FIG. 9 as luminance nonuniformity correcting unit 20. Incidentally, also in the description with reference to FIG. 9, a case corresponding to the [R, G, and B] system will first be taken as an example.

Three correction processing systems having correcting circuit units 21A, 21B, and 21C corresponding to R, G, and B as a correction circuit unit 21 are provided. As two-dimensional correction amount data to be input to the correcting circuit units 21A, 21B, and 21C in these correction processing systems, only two kinds of two-dimensional correction amount data, that is, a first two-dimensional correction amount and a second two-dimensional correction amount are used.

The first two-dimensional correction amount data is two-dimensional correction amount data created and adjusted to make luminance nonuniformity correction on a color component of R. The second two-dimensional correction amount data is two-dimensional correction amount data created and adjusted to make luminance nonuniformity correction on a color component of B. That is, the present embodiment does not use two-dimensional correction amount data corresponding to a color component of G for luminance nonuniformity correction. Thus, only two reference correction amount tables corresponding to R and B are to be stored and retained in a memory, for example. The data size of the reference correction amount tables as a whole is further reduced by an amount corresponding to the omission of the reference correction amount table corresponding to the color component of G.

Incidentally, the first two-dimensional correction amount data and the second two-dimensional correction amount data in this case may be formed of correction amount data simply obtained so as to cancel individual measured luminance differences of R and B. However, the first two-dimensional correction amount data and the second two-dimensional correction amount data may be formed of correction amount data determined so as to obtain a best result of improvement of luminance nonuniformity when an actual displayed image as a whole is viewed while luminance nonuniformity correction is made mainly for R and B, for example.

The luminance nonuniformity correcting unit 20 in FIG. 9 has switches SW1, SW2, and SW3 for changing paths for inputting the first two-dimensional correction amount and the second two-dimensional correction amount to the correcting circuit units 21. The switches SW1, SW2, and SW3 each effect the change by alternatively connecting a terminal T1 to one of terminals T2, T3, and T4, and effect the change in such a manner as to be interlocked with each other. The terminals T1 of the switches SW1, SW2, and SW3 are connected to correction amount data inputs of the correcting circuit units 21A, 21B, and 21C, respectively.

The terminals T2 and T3 of the switch SW1 are supplied with the first two-dimensional correction amount data. The terminal T4 of the switch SW1 is grounded (may be open conceptually).

The terminal T2 of the switch SW2 is supplied with the second two-dimensional correction amount data. The terminal T3 of the switch SW2 is grounded. The terminal T4 of the switch SW2 is also supplied with the second two-dimensional correction amount data.

The terminal T2 of the switch SW3 is grounded. The terminal T3 of the switch SW3 is supplied with the second two-dimensional correction amount data. The terminal T4 of the switch SW3 is supplied with the first two-dimensional correction amount data.

Patterns of the first two-dimensional correction amount data and the second two-dimensional correction amount data input to the correcting circuit units 21A, 21B, and 21C according to the changed states of the switches SW1, SW2, and SW3 are as follows.

The first pattern when the terminals T2 of the switches SW1, SW2, and SW3 are connected to the terminals T1 is as follows.

Correcting circuit unit 21A (corresponding to R)←First two-dimensional correction amount data (corresponding to R)

Correcting circuit unit 21B (corresponding to B)←Second two-dimensional correction amount data (corresponding to B)

Correcting circuit unit 21C (corresponding to G)←Grounded: no input of correction amount data The second pattern when the terminals T3 of the switches SW1, SW2, and SW3 are connected to the terminals T1 is as follows.

Correcting circuit unit 21A (corresponding to R)←First two-dimensional correction amount data (corresponding to R)

Correcting circuit unit 21B (corresponding to B)←Grounded: no input of correction amount data Correcting circuit unit 21C (corresponding to G)←Second two-dimensional correction amount data (corresponding to B)

The third pattern when the terminals T4 of the switches SW1, SW2, and SW3 are connected to the terminals T1 is as follows.

Correcting circuit unit 21A (corresponding to R)←Grounded: no input of correction amount data Correcting circuit unit 21B (corresponding to B)←Second two-dimensional correction amount data (corresponding to B)

Correcting circuit unit 21C (corresponding to G)←First two-dimensional correction amount data (corresponding to R)

Thus, in the luminance nonuniformity correcting unit 20 shown in FIG. 9, the first two-dimensional correction amount data corresponding to the correction of the R component and the second two-dimensional correction amount data corresponding to the correction of the B component are input to two correcting circuit units, respectively, selected from the correcting circuit units 21A, 21B, and 21C. That is, the configuration shown in FIG. 9 obtains an effect of correcting luminance nonuniformity of the screen as a whole as a result of correcting luminance nonuniformity for the two R and B color components of the R, G, and B color components, for example, based on the fact that even if luminance nonuniformity correction is not made for each of the R, G, and B color components, for example, a state of luminance nonuniformity is improved to a degree where visually there is no problem, for example, when luminance nonuniformity correction is made for a part of these color components.

In the configuration shown in FIG. 9, based on the fact that the first two-dimensional correction amount data corresponds to the R color component and the second two-dimensional correction amount data corresponds to the B color component, the paths formed in the first pattern are optimum paths, through which paths the first two-dimensional correction amount data (corresponding to R) is input to the correcting circuit unit 21A (corresponding to R), and the second two-dimensional correction amount data (corresponding to B) is input to the correcting circuit unit 21B (corresponding to B). Hence, at normal times, it suffices to connect the terminals T2 of the switches SW1, SW2, and SW3 to the terminals T1 to form the above signal paths.

However, there are cases where an expected result is not obtained from luminance nonuniformity correction using the above-described signal paths because of some factor. In such cases, daring to use the paths in the second pattern or the third pattern other than the first pattern may lead to a better correction result.

The changing of the switches SW1, SW2, and SW3 should be performed in such situations.

It suffices to change the switches SW1, SW2, and SW3 in timing corresponding to a pixel unit at a time of image display, for example. For this, when reference correction amount tables are created, measurement is performed, and a pattern that provides a best correction result among the first to third patterns is estimated for each pixel or each image area part. Information indicating a correspondence between the pixel and the pattern is created on the basis of the result, and is retained. Then, as display control, switch changing control is performed referring to the information.

As relations between the correcting circuit units 21 and inputs of two-dimensional correction amount data on the basis of the foregoing first to third patterns, there are cases (the second pattern and the third pattern) where the correcting circuit unit 21C corresponding to the G color component is supplied with the first two-dimensional correction amount data (corresponding to R) or the second two-dimensional correction amount data (corresponding to B). The correcting circuit unit 21A corresponding to the R color component is only supplied with the first two-dimensional correction amount data (corresponding to R) or no data, and is not supplied with the second two-dimensional correction amount data (corresponding to B). Similarly, the correcting circuit unit 21B corresponding to the B color component is only supplied with the second two-dimensional correction amount data (corresponding to B) or no data, and is not supplied with the first two-dimensional correction amount data (corresponding to R).

This is because R and B are complementary colors. Thus, it is difficult to correct luminance nonuniformity corresponding to the R color component by an amount of correction corresponding to the B color component. Similarly, it is difficult to correct luminance nonuniformity corresponding to the B color component by an amount of correction corresponding to the R color component. Accordingly, patterns from which a good correction result cannot be expected are excluded, and only the patterns as described above are prepared to perform switching.

When the configuration shown in FIG. 9 is applied to the [Y, Cr, and Cb] system, the [Y, Pr, and Pb] system or the like other than the [R, G, and B] system, it suffices to for example input a Cr or Pr signal to the video signal input corresponding to R, input a Cb or Pb signal to the video signal input corresponding to B, and input a Y signal to the video signal input corresponding to G.

Figure 10:
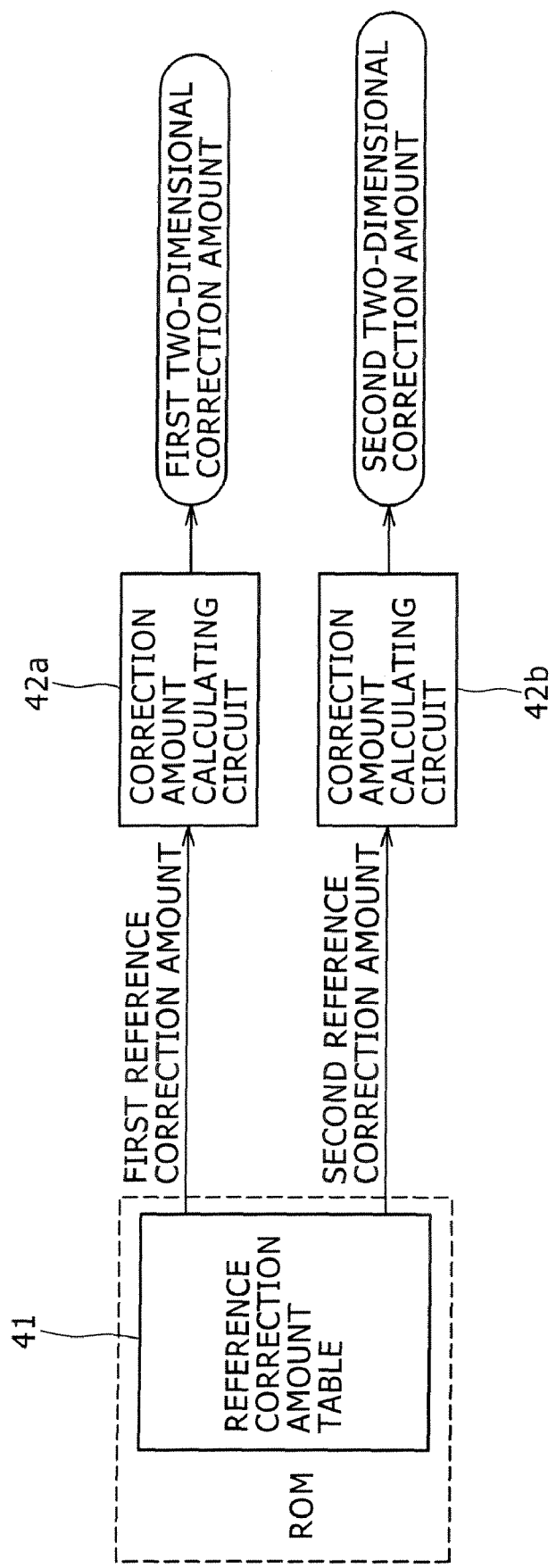
FIG. 10 is a block diagram showing a configuration for generating two-dimensional correction amount data corresponding to each pixel from reference correction amount data of a reference correction amount table.

FIG. 10 shows a block configuration for generating first two-dimensional correction amount data and second two-dimensional correction amount data corresponding to a pixel unit which data is to be input to the correcting circuit units 21A, 21B, and 21C.

In practice, the two-dimensional correction amount data based on the structure shown in FIG. 2, that is, a reference correction amount table 41 is written and retained in a ROM (or an EEPROM, a flash memory or the like), which is a storage element as hardware. The reference correction amount table 41 in this case has two tables corresponding to a first two-dimensional correction amount and a second two-dimensional correction amount. That is, the reference correction amount table 41 is composed of two tables, that is, a reference correction amount table for luminance nonuniformity correction in correspondence with the R color component and a reference correction amount table for luminance nonuniformity correction in correspondence with the B color component.

A correction amount calculating circuit 42a generates first two-dimensional correction amount data corresponding to a pixel unit. For this, as described above with reference to FIG. 2, the correction amount calculating circuit 42a identifies an inter-reference correction point area including a pixel position corresponding to a video signal to be corrected, and obtains reference correction amounts (first reference correction amounts) forming the identified inter-reference correction point area from the table for a first two-dimensional correction amount (corresponding to R) in the reference correction amount table 41. Then, the first two-dimensional correction amount for the video signal at the pixel position is generated by performing the interpolation process described with reference to FIG. 2 using the first reference correction amounts.

Similarly to the operation of the correction amount calculating circuit 42a, a correction amount calculating circuit 42b obtains reference correction amounts (second reference correction amounts) forming the identified inter-reference correction point area from the table for a second two-dimensional correction amount (corresponding to B) in the reference correction amount table 41. Then, the second two-dimensional correction amount is generated by performing the interpolation process using the obtained second reference correction amounts.

The first two-dimensional correction amount data and the second two-dimensional correction amount data thus generated are input to the correcting circuit units 21A, 21B, and 21C via the switches SW1, SW2, and SW3 shown in FIG. 9.

Image display devices displaying an image on the basis of a video signal often employ a configuration that subjects the video signal to nonlinear processing including gamma correction and the like. As is well known, gamma correction, for example, is originally intended to correct luminance characteristics of a cathode-ray tube with respect to voltage on a video signal transmitting side. Now, on a display output device side, in order to improve contrast at intermediate luminance or the like, gamma nonlinear processing on the transmitting side or gamma correction for providing a video signal with characteristics that do not cancel nonlinear characteristics on the display device side is performed. Such signal processing for contrast enhancement such as gamma correction or the like can be said to be processing for emphasizing luminance gradation in a two-dimensional space as an image. Such processing will be referred to as processing of a spatial emphasizing system.

Consideration will be given to a relation between a signal processing system for luminance nonuniformity correction according to the present embodiment and the processing of a spatial emphasizing system as described above.

Luminance nonuniformity correction processing changes luminance for correction in only an area of the display device where luminance nonuniformity occurs. When a video signal resulting from such luminance changing processing is input to be subjected to the processing of the spatial emphasizing system, change in luminance as a result of luminance nonuniformity correction may vary an amount of correction in the spatial emphasizing system in a direction to cause an error. As a result, correction such for example as gamma correction may become improper, and degrade display image quality instead.

Accordingly, when the signal processing system for luminance nonuniformity correction according to the present embodiment and the spatial emphasizing signal processing system are combined with each other, a luminance nonuniformity correcting unit 20 is disposed in a stage subsequent to a spatial emphasizing system processing unit 51 that performs the signal processing of the spatial emphasizing system, as shown in FIG. 11A.

Thus, change in luminance as a result of luminance nonuniformity correction does not affect the nonlinear signal processing of the spatial emphasizing system processing unit 51, so that the problem of an error in the amount of correction as described above is solved.

In addition, there is a case where as video signal processing opposite to the signal processing of the spatial emphasizing system, for example, signal processing of a spatial easing system that produces an effect of easing luminance gradation in a space as an image is performed. The signal processing of a spatial easing system is for example processing such as dither, error diffusion or the like. When such processing is performed on a video signal, for example contrast in the image space is lowered, and apparent gradation is increased.

Generally, as described above, luminance nonuniformity correction changes luminance in only an area of the display device where luminance nonuniformity occurs. Thus, when luminance nonuniformity correction is made on a video signal that has uniform image contents as a whole displayed, a difference may occur instead between apparent image luminance in an area corresponding to a corrected video signal and apparent image luminance in an area corresponding to a non-corrected video signal. The difference may be visually perceived to be unnatural. Incidentally, such a phenomenon tends to occur easily especially when the luminance of the screen as a whole is lowered.

Thus, when the signal processing system for luminance nonuniformity correction according to the present embodiment and the spatial easing signal processing system are combined with each other, it is desirable that a spatial easing system processing unit 52 that performs the signal processing of the spatial easing system be disposed in a stage subsequent to a luminance nonuniformity correcting unit 20, as shown in FIG. 11B. Such a configuration allows the spatial easing system processing unit 52 in the subsequent stage to suppress or eliminate a luminance difference caused by luminance nonuniformity correction, so that excellent display image quality is obtained.

Incidentally, as with the luminance nonuniformity correcting unit 20 according to the present embodiment, the spatial emphasizing system processing unit 51 and the spatial easing system processing unit 52 shown in FIGS. 11A and 11B may be considered to be included in the video signal processing unit 16 shown in FIG. 1.

As a supplement, FIG. 12 schematically shows an example of configuration of an adjusting jig system for luminance nonuniformity correction.

The television receiver 1 according to the present embodiment is shown in FIG. 12. The television receiver 1 is in a process stage for adjusting luminance nonuniformity in a manufacturing process.

In adjusting luminance nonuniformity, an image is displayed on the screen of the liquid crystal display unit 18 of the television receiver 1 on the basis of a predetermined video signal for measurement, for example. Then, the displayed image is taken by a camera 60. An image pickup signal of the image taken by the camera 60 is input to a correction amount information generating device 61.

The correction amount information generating device 61 is for example formed by a computer system or the like. The correction amount information generating device 61 measures a state of luminance nonuniformity in an image area on the basis of the input video signal, and determines amounts of correction to be given to the video signal to cancel the luminance nonuniformity according to a result of the measurement. The amounts of correction obtained at this time are for example reference correction amount data corresponding to each correction point described with reference to FIG. 2. Then, correction amount information formed as a set of reference correction amount data (a reference correction amount table in the embodiment) is written and stored in a predetermined storage unit (for example a ROM, a flash memory or the like) provided in an internal circuit 1a of the television receiver 1. Incidentally, the internal circuit 1a in this case represents a set of the functional circuit parts shown in FIG. 1, for example.

As is understood from such adjusting operation of the luminance nonuniformity correction, the larger the number of correction points, the more the time and trouble for adjustment and the heavier the load of processing to be performed on the correction amount information generating device 61, thus decreasing manufacturing efficiency. Conventionally, an amount of adjustment work (time) and the construction of a processing algorithm or the like for obtaining correction amount data for a plurality of reference correction amount tables corresponding to the luminance (brightness) direction by the system shown in FIG. 12 are required. In the present embodiment, on the other hand, it suffices to obtain correction amount data for one reference correction amount table corresponding to one specific luminance, so that the amount of adjustment work is correspondingly reduced and the processing load on the correction amount information generating device 61 becomes lighter.

Incidentally, while as described above, the configuration for luminance nonuniformity correction according to the present embodiment is effective in situations in which correction points are increased because LEDs are employed as a backlight, an effect of reducing an amount of data for luminance nonuniformity correction by having only amounts of correction used in linear proportion or nonlinear proportion is similarly obtained when the present invention is applied to other image display devices in general, including cathode-ray tube display devices, plasma display devices, organic EL (Electro Luminescence) display devices and the like.

In addition, while the present embodiment has only one set of a reference correction amount table corresponding to one specific luminance for one video signal component, the present embodiment may have two sets or more of reference correction amount tables corresponding to two or more luminances for one video signal component. When the present embodiment has two sets or more of reference correction amount tables, more accurate and reliable luminance nonuniformity correction is expected because for example parameters including coefficients for linear proportion or nonlinear proportion and the like can be set so as to be adapted by the luminance of each reference correction amount table. In other words, when image quality equal to image quality obtained by making luminance nonuniformity correction using a predetermined number of reference correction amount tables by the structure described with reference to FIG. 4 and FIG. 5, for example, is to be obtained by the structure according to the present embodiment, the required number of reference correction amount tables can be reduced.

It should be understood by those skilled in the art that various modifications, combinations, sub-combinations and alterations may occur depending on design requirements and other factors insofar as they are within the scope of the appended claims or the equivalents thereof.

What is claimed is:

1. A display image correcting device comprising:
    retaining means configured to retain reference correction amount data for correcting nonuniformity as a predetermined factor of an image displayed on a basis of a video signal, said reference correction amount data representing an amount of correction at a predetermined horizontal and vertical position of said image, said amount of correction being obtained in correspondence with a video signal level as a reference; and correcting means configured to perform correction processing on said video signal in correspondence with a horizontal direction and a vertical direction of said image, and a brightness direction, and performing the correction processing on a basis of three-dimensional correction amount data obtained by making two-dimensional correction amount data corresponding to a horizontal and vertical position, said two-dimensional correction amount data being obtained on a basis of said reference correction amount data, linearly proportional or nonlinearly proportional to level of the video signal to be corrected.

2. The display image correcting device as claimed in claim 1,
wherein a plurality of reference correction points are set for the displayed image, and said reference correction amount data represents amounts of correction at horizontal and vertical positions as said plurality of reference correction points; and
said two-dimensional correction amount data is correction amount data for each of pixels forming said image, and is obtained after weights are assigned to reference correction amount data at reference correction points adjacent to each other in the horizontal direction and the vertical direction for said pixel.

3. The display image correcting device as claimed in claim 1,
wherein the nonuniformity as said predetermined factor is nonuniformity of one of luminance and chromaticity of said image; and
said correcting means performs correction processing to correct the nonuniformity of one of the luminance and the chromaticity of said image.

4. The display image correcting device as claimed in claim 1,
wherein said correcting means comprises
a multiplier for multiplying said video signal to be corrected in a digital form by said two-dimensional correction amount data in an addition and subtraction format, said two-dimensional correction amount data being obtained on the basis of said reference correction amount data, and
an adder for adding an output of said multiplier to said video signal to be corrected in the digital form; and
an output of said adder is output as a corrected video signal.

5. The display image correcting device as claimed in claim 1,
wherein said correcting means includes a multiplier for multiplying said video signal to be corrected in a digital form by said two-dimensional correction amount data in a coefficient format, said two-dimensional correction amount data being obtained on the basis of said reference correction amount data; and
an output of said multiplier is output as a corrected video signal.

6. The display image correcting device as claimed in claim 1,
wherein said correcting means comprises
a nonlinear circuit for giving a predetermined nonlinear characteristic according to the level of said video signal to be corrected in a digital form,
a multiplier for multiplying an output of said nonlinear circuit by said two-dimensional correction amount data in an addition and subtraction format, said two-dimensional correction amount data being obtained on the basis of said reference correction amount data, and
an adder for adding an output of said multiplier to said video signal to be corrected in the digital form; and
an output of said adder is output as a corrected video signal.

7. The display image correcting device as claimed in claim 1,
wherein said correcting means comprises
a nonlinear circuit for giving a predetermined nonlinear characteristic according to the level of said video signal to be corrected in a digital form,
a first multiplier for multiplying an output of said nonlinear circuit by said two-dimensional correction amount data in a coefficient format, said two-dimensional correction amount data being obtained on the basis of said reference correction amount data, and
a second multiplier for multiplying an output of said first multiplier by said video signal to be corrected, said video signal to be corrected being input to said second multiplier; and
an output of said second multiplier is output as a corrected video signal.

8. The display image correcting device as claimed in claim 1,
wherein said video signal to be corrected is composed of a combination of three primary-color signals or a luminance signal and two color-difference signals;
said retaining means retains two kinds of said two-dimensional correction amount data as correction amount data corresponding to two predetermined signals of said three primary-color signals or two predetermined signals of the luminance signal and the two color-difference signals; and
said correcting means has a correction processing system for performing the correction processing on each of the three primary-color signals or each of the luminance signal and the two color-difference signals, and one of said two kinds of two-dimensional correction amount data is selected and input to each said correction processing system.

9. The display image correcting device as claimed in claim 1,
wherein said correcting means is disposed in a stage subsequent to a predetermined signal processing unit that emphasizes luminance gradation of the displayed image.

10. The display image correcting device as claimed in claim 1,
wherein said correcting means is disposed in a stage preceding a predetermined signal processing unit that eases luminance gradation of the displayed image.

11. An image display device comprising:
a display image correcting device unit; and
a display device unit for displaying an image on a basis of a video signal corrected by said display image correcting device unit;
wherein said display image correcting device unit includes
retaining means configured to retain reference correction amount data for correcting nonuniformity as a predetermined factor of said image displayed on the basis of the video signal, said reference correction amount data representing an amount of correction at a predetermined horizontal and vertical position of said image, said amount of correction being obtained in correspondence with a video signal level as a reference, and
correcting means for performing correction processing on said video signal in correspondence with a horizontal direction and a vertical direction of said image, and a brightness direction, and performing the correction processing on a basis of three-dimensional correction amount data obtained by making two-dimensional correction amount data corresponding to a horizontal and vertical position, said two-dimensional correction amount data being obtained on a basis of said reference correction amount data, linearly proportional or nonlinearly proportional to level of the video signal to be corrected.

12. The image display device as claimed in claim 11, wherein said display device unit comprises a display panel for displaying the image on the basis of the video signal, and a light source for irradiating a back side of said display panel with light.

13. A display image correcting method comprising the steps of:
- reading reference correction amount data for correcting nonuniformity as a predetermined factor of an image displayed on a basis of a video signal, said reference correction amount data representing an amount of correction at a predetermined horizontal and vertical position of said image, said amount of correction being obtained in correspondence with a video signal level as a reference, from retaining means configured to retain said reference correction amount data;
- obtaining two-dimensional correction amount data corresponding to a horizontal and vertical position on a basis of said reference correction amount data;
- obtaining three-dimensional correction amount data corresponding to a horizontal direction and a vertical direction of said image and a brightness direction by making said two-dimensional correction amount data linearly proportional or nonlinearly proportional to level of the video signal to be corrected; and
- performing correction processing on said video signal on a basis of said three-dimensional correction amount data.

14. The display image correcting method as claimed in claim 13,
- wherein a plurality of reference correction points are set for the displayed image, and said reference correction amount data represents amounts of correction at horizontal and vertical positions as said plurality of reference correction points; and
- said two-dimensional correction amount data is correction amount data for each of pixels forming said image, and is obtained after weights are assigned to reference correction amount data at reference correction points adjacent to each other in the horizontal direction and the vertical direction for said pixel.

15. A display image correcting method as claimed in claim 13,
- wherein the nonuniformity as said predetermined factor is nonuniformity of one of luminance and chromaticity of said image; and
- said correcting step performs correction processing to correct the nonuniformity of one of the luminance and the chromaticity of said image.

16. A display image correcting device comprising:
- a retaining section retaining reference correction amount data for correcting nonuniformity as a predetermined factor of an image displayed on a basis of a video signal, said reference correction amount data representing an amount of correction at a predetermined horizontal and vertical position of said image, said amount of correction being obtained in correspondence with a video signal level as a reference; and
- a correcting section performing correction processing on said video signal in correspondence with a horizontal direction and a vertical direction of said image, and a brightness direction, and performing the correction processing on a basis of three-dimensional correction amount data obtained by making two-dimensional correction amount data corresponding to a horizontal and vertical position, said two-dimensional correction amount data being obtained on a basis of said reference correction amount data, linearly proportional or nonlinearly proportional to level of the video signal to be corrected.

* * * * *